United States Patent [19]

Yamaguchi et al.

[11] Patent Number: 4,938,304
[45] Date of Patent: Jul. 3, 1990

[54] THROTTLE VALVE CONTROL APPARATUS FOR A VEHICLE

[75] Inventors: Hisaaki Yamaguchi; Itaru Okuno; Nagahisa Fujita; Koji Hosoda, all of Hiroshima, Japan

[73] Assignee: Mazda Motor Corporation, Hiroshima, Japan

[21] Appl. No.: 243,862

[22] Filed: Sep. 13, 1988

[30] Foreign Application Priority Data

Sep. 14, 1987 [JP] Japan .................. 62-230828

[51] Int. Cl.$^5$ .............. B60K 28/16; B60K 31/00; F02D 11/10
[52] U.S. Cl. .................. 180/197; 123/342; 123/399
[58] Field of Search .............. 123/400, 399, 342; 180/197; 251/54

[56] References Cited

U.S. PATENT DOCUMENTS

| 4,703,823 | 11/1987 | Yogo et al. ............ 123/399 X |
| 4,721,281 | 1/1988 | Kratt et al. ............ 123/400 X |
| 4,787,353 | 11/1988 | Ishikawa et al. ........ 123/400 X |

FOREIGN PATENT DOCUMENTS 122742 7/1984 Japan .................. 123/399
62-170740 7/1987 Japan .

Primary Examiner—Mitchell J. Hill
Attorney, Agent, or Firm—Wegner & Bretschneider

[57] ABSTRACT

First, second and third levers are disposed pivotably and rotatably relative to each other about a predetermined axis. The first lever is operated in association with an accelerator to be rotated in a predetermined one direction in accordance with operation in a direction of opening the accelerator. The second lever is operated in association with a throttle valve so as to open the throttle valve when the second levler is pivotted in the predetermined one direction and it is urged by a first urging member in a direction of closing the throttle valve. The first lever is provided with a first stopper section and the second lever is provided with a second stopper section as to be abuttable with the first stopper section from the predetermined one direction. The first stopper section is urged in such a manner as being brought into abut with the second stopper section by means of a second urging member larger in an urging force than the first urging member. The second lever is forcibly pivotted in the same direction as the third lever in resistance to the second urging member when the third lever is pivotted in a direction opposite to the predetermined one direction by a motor.

12 Claims, 5 Drawing Sheets

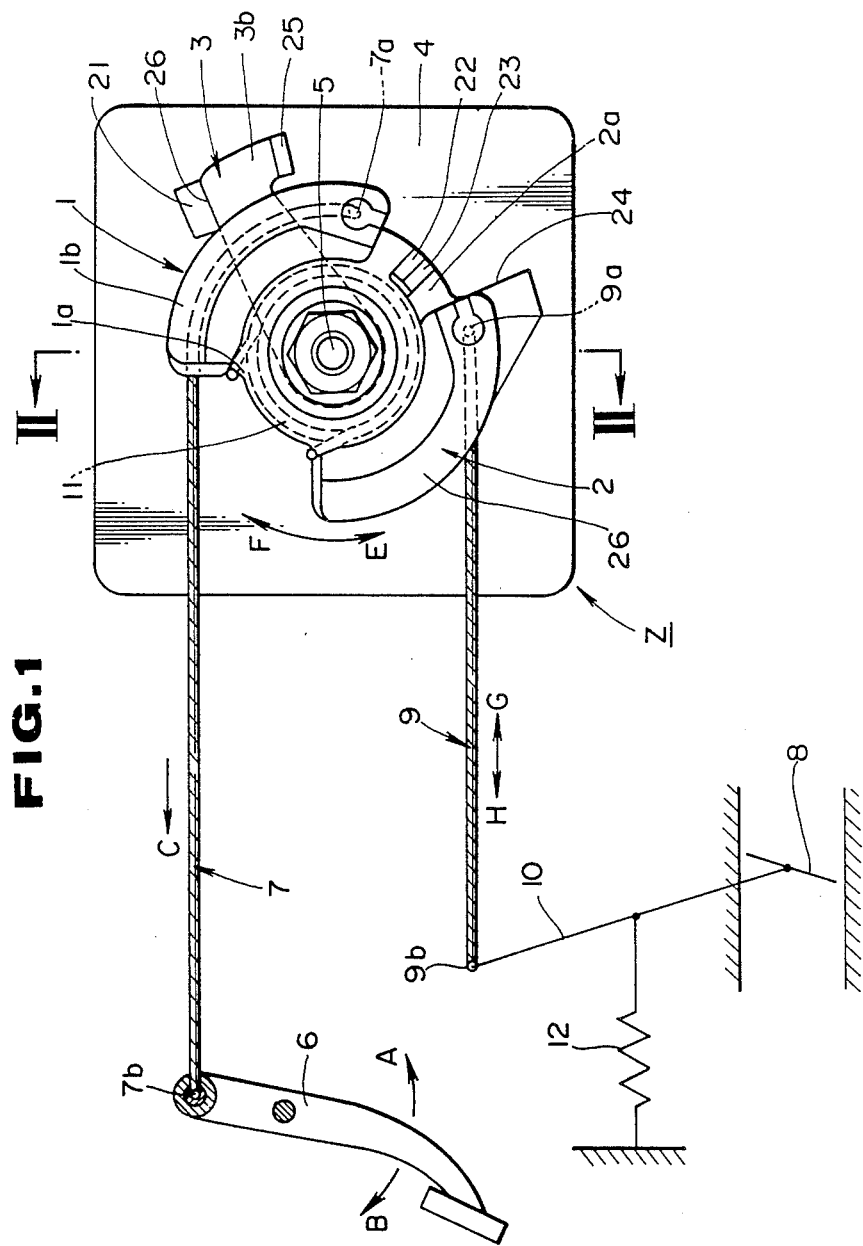

THROTTLE VALVE CONTROL APPARATUS FOR A VEHICLE

BACKGROUND OF THE INVENTION

1. Field of the Invention

The present invention relates to an apparatus for controlling a degree of opening of a throttle valve for a vehicle.

2. Description of Related Art

As one of conventional methods of controlling a driving state of a vehicle is a traction control that is a control for reducing or converging degrees of slippage by decreasing a driving torque of driven wheels, for example, by means of braking or reducing an engine output when a degree of slippage of a driven wheel on pavement exceeds a predetermined value-specifically, when a slip ratio specified by a balance of rotations of the driven and undriven wheels exceeds a given value.

A method of reducing the engine output is disclosed, for example, in Japanese Patent Publication (laid-open) No. 22,948/1982 where it is described such that a degree of opening of a throttle valve for an engine is forcibly reduced separately from operation of stepping an accelerator pedal down when a slippage has occurred, thereby controlling the engine output.

This known method suffers from the disadvantage, however, that a control over a degree of opening of the throttle valve at the time of traction control is implemented using a hydraulic mechanism which is complicated and is likely to raise a cost.

SUMMARY OF THE INVENTION

The present invention has the object to provide an apparatus for controlling a degree of opening of a throttle valve for a vehicle of an extremely simple structure, which is adapted to displace the throttle valve in a range from the position at which it is fully closed to the position at which it is fully open in accordance with operation of closing and opening the accelerator at the time of no implementation of a traction control or at the time of ordinary driving and to displace the throttle valve in a direction in which the throttle valve is forcibly closed, prior to the operation of the accelerator at the time of implementation of the traction control and so on.

In order to accomplish the above object according to the present invention, the present invention consists of an apparatus of controlling a degree of opening of a throttle valve for a vehicle, which comprises a first lever disposed pivotably about a predetermined axis and connected to an accelerator so as to be pivotable in predetermined one direction in accordance with operation of opening the accelerator; a second lever disposed pivotably about the predetermined axis relative to the first lever, the second lever being movably associated with the throttle valve so as to displace the throttle valve in a direction of opening the throttle valve when pivoted in the predetermined one direction; a first urging means for urging the throttle valve in a direction in which the throttle valve is closed; an engagement means containing a regulation means and a second urging means, the regulation means being brought into abut with said first lever from the predetermined one direction and the second urging means being larger in an urging force than the first urging means, in which the engagement means for engaging the first lever with the second lever allows the second lever to be urged by the second urging means from the predetermined one direction and at the same time regulates the second lever from being pivoted against the first lever toward the predetermined one direction away from the predetermined relative pivot position by the regulation means in order to allow the first and second levers to be engaged with each other so as to be pivotable integrally while they are held at a predetermined relative pivot position; and a third lever disposed pivotably about the axis as a pivotal center and relative to the first and second levers and drivable by a motor whose operation is regulated in accordance with a driving state of the vehicle; in which the second lever is returned toward a direction opposite to the predetermined one direction by the first urging means by reducing an urging action of the second lever by means of the second urging means by pivoting the third lever by the motor in a direction opposite to the predetermined one direction.

In association with a traction control apparatus, the present invention consists specifically of, in a vehicle equipped with a traction device adapted to be returned to a direction in which a throttle valve of an engine is forcibly closed when a slip value of a driven wheel on pavement becomes larger than a predetermined value, an apparatus for controlling a degree of opening of a throttle valve mounted in the vehicle, which comprises a first lever disposed pivotably about a predetermined axis and connected to an accelerator so as to be pivotable in predetermined one direction in accordance with operation of opening the accelerator; a second lever disposed pivotably about the predetermined axis relative to the first lever, the second lever being movably associated with the throttle valve so as to displace the throttle valve in a direction of opening the throttle valve when pivoted in the predetermined one direction; a first urging means for urging the throttle valve in a direction in which the throttle valve is closed; an engagement means containing a regulation means and a second urging means, the regulation means being brought into abut with the first lever from the predetermined one direction and the second urging means being larger in an urging force than the first urging means, in which the engagement means for engaging the first lever with the second lever allows the second lever to be urged by the second urging means from the predetermined one direction and at the same time regulates the second lever from being pivoted against the first lever toward the predetermined one direction away from a predetermined relative pivot position by the regulation means in order to allow the first and second levers to be engaged with each other so as to be pivotable integrally while they are held at the predetermined relative pivot position; and a third lever disposed pivotably about the axis and relative to the first and second levers and drivable by a motor whose operation is regulated in accordance with a driving state of the vehicle; in which the second lever is returned toward a direction opposite to the predetermined one direction by the first urging means by reducing an urging action of the second lever by means of the second urging means by pivoting the third lever by the motor in a direction opposite to the predetermined one direction when a degree of slip of the driven wheel on pavement is larger than the predetermined value.

It is preferred that a mounting shaft to be rotatably driven by the motor is designed to provide the predetermined axis. In this case, the first and second levers are mounted rotatably relative to the mounting shaft, while the third lever is fixed to the mounting shaft. The mounting shaft can work as an output shaft of the motor.

The regulation means consisting of a portion of the engagement means provides the simplest construction by a structure of the first stopper section formed on the first lever and the second stopper section formed on the second lever in such a manner as being abuttable with the first stopper section in the predetermined one direction. And the first stopper section is brought into abut with the second stopper section by the second urging means in resistance to the first urging means. At the predetermined relative pivot position at which the first and second stopper sections are in abut with each other, the first lever is pivoted in predetermined one direction in accordance with operation of opening the accelerator, whereas the second lever is pivoted in predetermined one direction by the same amount as an amount of a pivotal movement of the first lever transmitted to the second lever through the second urging means. It is noted that a range in which the second lever is fully pivoted is from the position at which the throttle valve is fully closed to the position at which it is fully opened as long as the third lever is not operated.

The second urging means may be disposed such that its one end portion is fixed to the vehicle body and its other end portion acts on the second lever or the regulation means. In this case, a return spring may be separately mounted on a connected set of the accelerator and the first lever so as to allow the first lever to be returned or pivotted in a direction opposite to the predetermined one direction when the accelerator is open. The return spring is set to be larger in an urging force than the second urging means.

Preferably, the second urging means is expandedly disposed between the first level and the regulation means or the second lever. The first lever is urged by the first urging means in a direction in which the throttle valve is closed through the second urging means so that the additional disposition of the return spring is not needed.

As the second lever is associated with the first and third levers, it is preferred that the second lever is interposed between the first lever and the third lever in an axial direction of the mounting shaft. And it is preferred that a coil spring is used as the second urging means and it is interposed between the first lever and the second lever in such a state that the second urging means is inserted and fit into an outer circumference of the mounting shaft.

The third lever is designed such that it is pivotted in a direction opposite to the predetermined one direction when a traction control is required and that it allows the second lever to be pivoted by the first urging means from the predetermined relative pivot position in a direction in which the throttle valve is closed by reducing the urging force of the second urging means. In other words, the third lever is designed so as to regulate an amount of a pivotal movement of the second lever in the predetermined one direction in accordance with a pivotal movement of the first lever in the predetermined one direction. Briefly speaking, the third lever is designed so as to provide a force to return the second lever directly in a direction opposite to the predetermined one direction. At this end, the third lever is provided with the third stopper section while the second lever is provided with the fourth stopper section abuttable with the third stopper section from the predetermined one direction.

The third lever is only to provide an action in a direction in which the throttle valve is returned so that a degree of opening of the throttle valve is carelessly rendered larger than a degree of opening of the throttle valve in accordance with a position at which the accelerator is operated. This is preferred from the fail safety point of view when the motor is out of order.

For the movement of the accelerator in association with the first lever and for the movement of the second lever in association with the throttle valve, it is preferred to use a wire cable although a push-pull rod or the like may be used. The use of the wire cable prevents an interference with other instruments and devices while enhancing the freedom of a disposition of mechanism portions containing the first, second and third levers and the second urging means.

The other objects and advantages of the present invention will become apparent in the course of the description on working examples that follow.

BRIEF DESCRIPTION OF DRAWINGS

FIG. 1 is a view illustrating an essentional structural portion of the apparatus for controlling a degree of opening of the throttle valve in accordance with the present invention

DETAILED DESCRIPTION OF THE PREFERRED EMBODIMENTS

Figure 2:
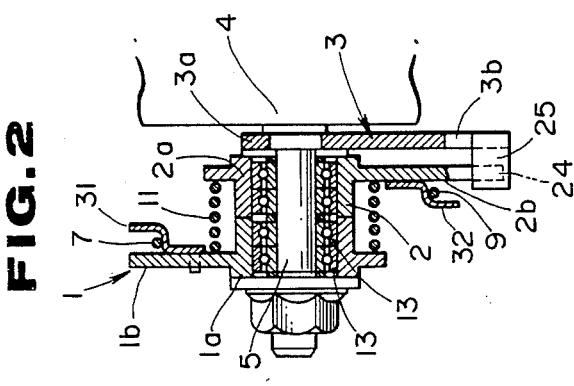
FIG. 2 is a longitudinally cross-sectional view as taken along the line II—II of FIG. 1.

Referring to FIGS. 1 and 2, an apparatus Z of controlling a degree of opening of a throttle valve for a vehicle according to an example of the present invention is shown, which is interposed between an accelerator pedal 6 and a throttle valve 8 and contains a lever mechanism consisting of a first lever 1, a second lever 2 and a third lever 3, as will be described in detail later, and a motor 4 (in this embodiment, a stepping motor) operably derivable in accordance with a degree of slippage of a driven wheel (not shown). And it is shown that an output shaft 5 of the motor 4 functions as a mounting shaft for each of the first, second and third levers 1, 2 and 3, respectively.

The first lever 1 comprises a lever member consisting of a boss section 1a supported rotatably on the output shaft 5 of the motor 4 through a ball bearing 13 and a lever section 1b extending from one side of the boss section 1a toward the outside. To one side of the lever section 1b is fixed an arcuate guide 31 having the output shaft 5 as the center of curvature. In the arcuate guide 31 is wound a predetermined length of a first cable 7 one end portion 7a of which is engaged with the first lever 1, on the one hand, and the other end portion 7b of which is engaged with the accelerator pedal 6. This disposition of the first lever 1 permits a pivotal movement of the first lever 1 in the direction of arrow E by pulling the first cable 7 in the direction of arrow C when the accelerator pedal 6 is stepped down in the direction of arrow A. This pivotal movement in the direction of arrow E functions as a force of acting in predetermined one direction.

The second lever 2 comprises a lever member consisting of a boss portion 2a supported rotatably on the output shaft 5 of the motor 4 through the ball bearing 13 and a lever portion 2b extending and protruding outwardly from one side of the boss portion 2a. To one side of the lever portion 2b is fixed an arcuate guide 32 with the output shaft 5 as the center of curvature. In the arcuate guide 32 is wound a predetermined length of the second cable 9 one end portion 9a of which is engaged with the second lever 2 and the other end portion 9b of which is engaged with a throttle lever 10 mounted to the throttle valve 6.

To the throttle lever 10 is connected a spring 12 as a first urging means so as to provide a force to close the throttle valve 8. This structure permits the second cable 9 to be drawn in the direction of arrow G in resistance to the spring 12 when the second lever lever 2 is pivoted in the direction of arrow E, thus opening the throttle valve 8. A pivotal movement of the second lever 2 in the direction of arrow F allows the second cable 9 to be drawn in the direction of arrow H by the spring 12, thus displacing the throttle valve 8 in a direction in which it is closed.

The second lever 2 is located on the motor 4 side in the axial direction of the output shaft 5 compared to the first lever 1. In another words, the first lever 1 is located on the side closer to the tip portion of the output shaft 5 than the second lever 2. The respective first and second levers 1 and 2 each is provided with a stopper section which is designed so as to be brought into abut with the other stopper section at a predetermined relative pivot position. More specifically, the first lever 1 is provided with a first stopper section 22 at its end portion in the direction of arrow F, on the one hand, while the second lever 2 is provided with a second stopper section 23 at an end portion in the direction of arrow E, on the other hand. The first and second stopper sections 22 and 23, respectively, constitute a regulation section in an engagement means and each is located on the same locus of a pivotal movement with the output shaft 5 as the pivotal center, thus allowing the second lever 2 to be pivoted in the direction of arrow E relative to the first lever 1 to a predetermined relative pivot position as shown in FIG. 1 and consequently bringing the respective stopper sections 22 and 23 into abut with each other. At the relative pivot position at which the first stopper section 22 is abutted with the second stopper section 23, a further pivotal movement of the second lever 2 in the direction of arrow E is regulated if the first lever 1 is fixed and a further pivotal movement of the first lever 1 in the direction of arrow F is regulated if the second lever 2 is fixed.

Between the first lever 1 and the second lever 2 on a circumference of the output shaft 5 is inserted a coil spring 11 as a second urging means. The coil spring 11 has an urging force greater than that of the spring 12 as a first urging means. One end of the coil spring 11 is engaged with the first lever 1 and the other end thereof is engaged with the second lever 2. The coil spring 11 is arranged such the respective first and second levers 1 and 2 are urged to be located at the predetermined relative pivot position at which the relative first and second stopper sections 22 and 23 are brought into abut with each other. More specifically, the coil spring 11 provides an urging force in such a direction as the first lever 1 is urged by the second lever 2 in the direction of arrow F as well as the second lever 2 is urged by the first lever 1 in the direction of arrow E.

A length of each of the respective first and second cables 7 and 9 is set such that the throttle valve 8 can be displaced from the position at which it is fully closed to the position at which it is fully opened when the accelerator pedal 6 is at the open position (when the accelerator pedal 6 is at the stroke end in the direction of arrow B) to the close position in a state in which the first stopper section 22 is in abut with the second stopper section 23 at the predetermined relative pivot position. The first and second cables 7 and 9 are designed to correspond each to an inner cable which constitutes a wire cable consisting of an outer tube (not shown) and the inner cable inserted in the outer tube. The outer tube is designed such that its both end portions are fixed at least at its both end portions to the vehicle body in the proximity of the first and second levers 1 and 2, the accelerator pedal 6, and the throttle valve 6.

The third lever 3 is disposed closer to the side of the motor 4 than the second lever 2 or on the opposite side of the first lever 1 and is fixed at its base portion 3a to the output shaft 5 of the motor 4. A tip portion 3b of the third lever 3 extends outwardly from the stopper sections 22 and 23 in a radial direction of the output shaft 5 and forms a third stopper section 25 at the side surface in the direction of arrow F and a fifth stopper section 26 at the side surface in the direction of arrow E. To the motor 4 is fixed a stopper 21 with which the fifth stopper section 26 can be in abut from the direction of arrow E, and the third lever is located at the initial position as will be described in detail when the fifth stopper section 26 is in abut with the stopper section 26.

The second lever 2 is provided with a fourth stopper section 24 in such a manner as corresponding to the third stopper portion 25 of the third lever 3. The third stopper section 25 and the fourth stopper section 24 are positioned on the same pivotal locus with the output shaft 5 as the pivotal center, and the third stopper section 25 is abuttable with the fourth stopper section 24 as the third lever 3 is pivoted in the direction of arrow F.

Figure 4:
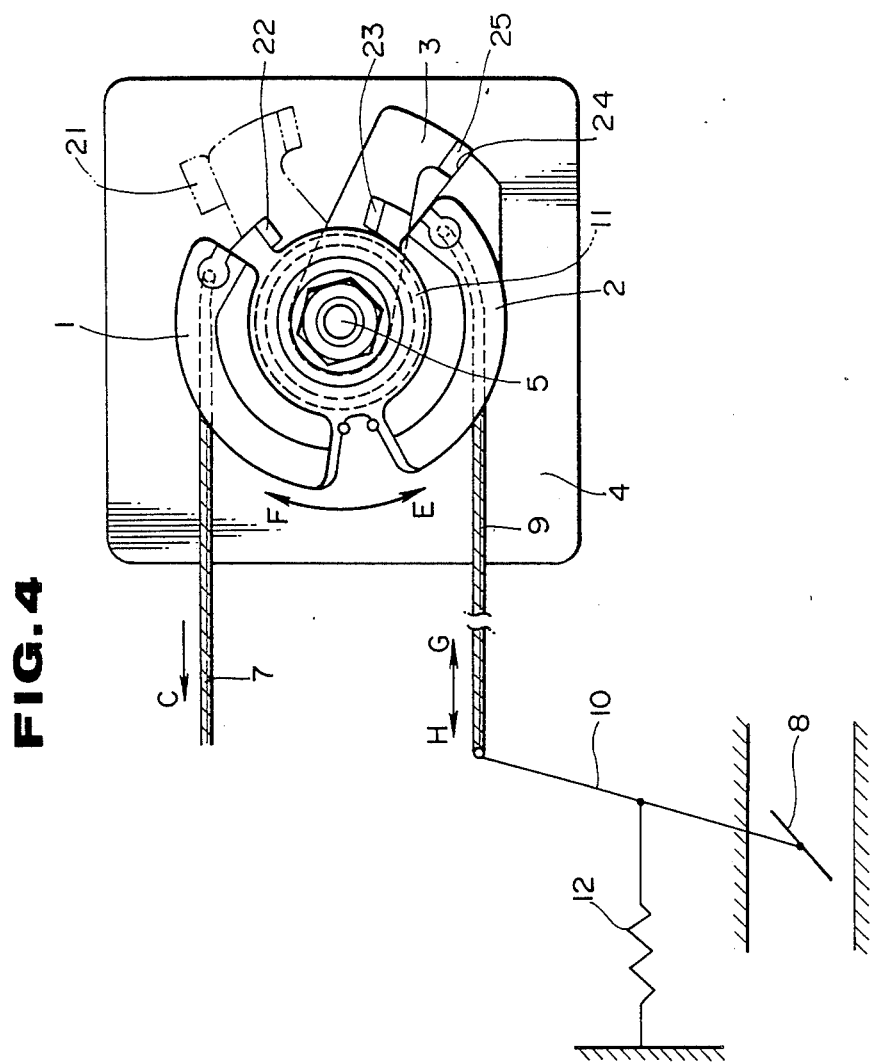
Figure 5:
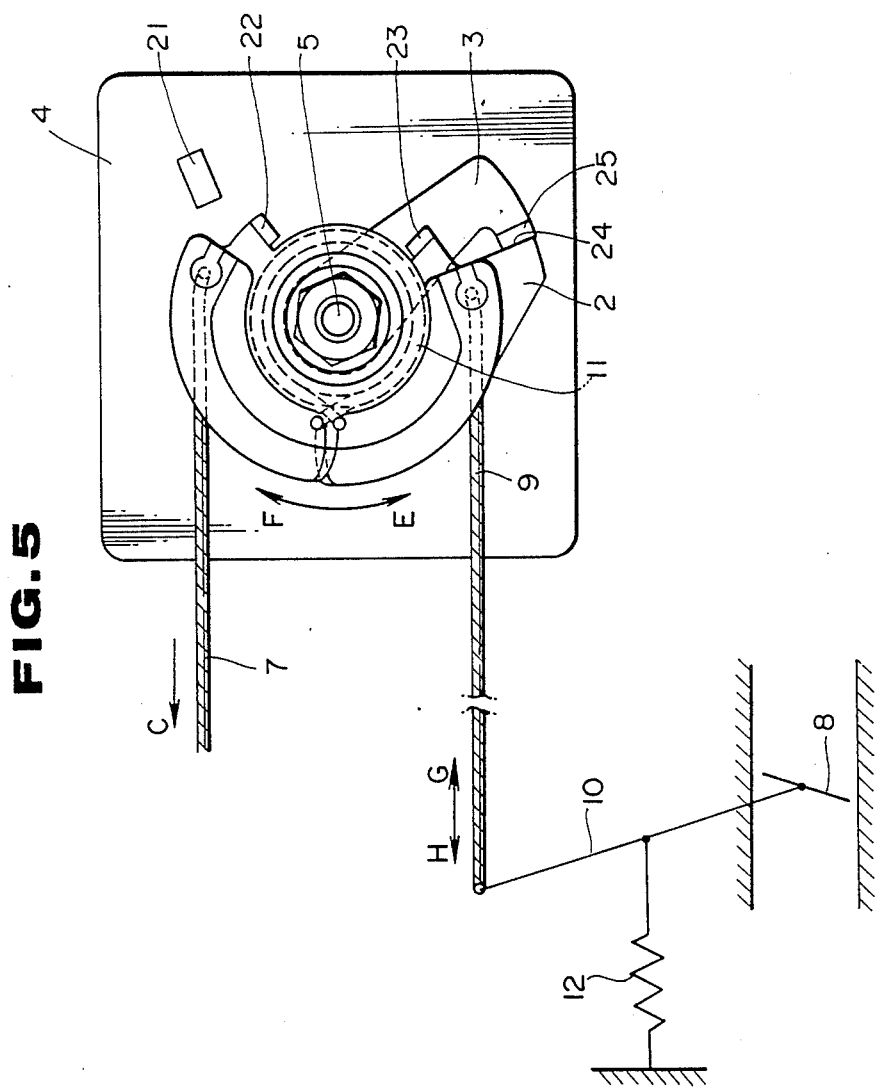

The present invention will be described more in detail with reference to FIGS. 3 to 5. The manners as shown in FIGS. 3 to 5 are further shown in FIGS. 6 to 8, respectively, in which the first, second and third levers 1, 2 and 3 are briefly drawn as they are in stroke movement.

(1) At the time of non-traction control (ordinary driving)

Figure 3:
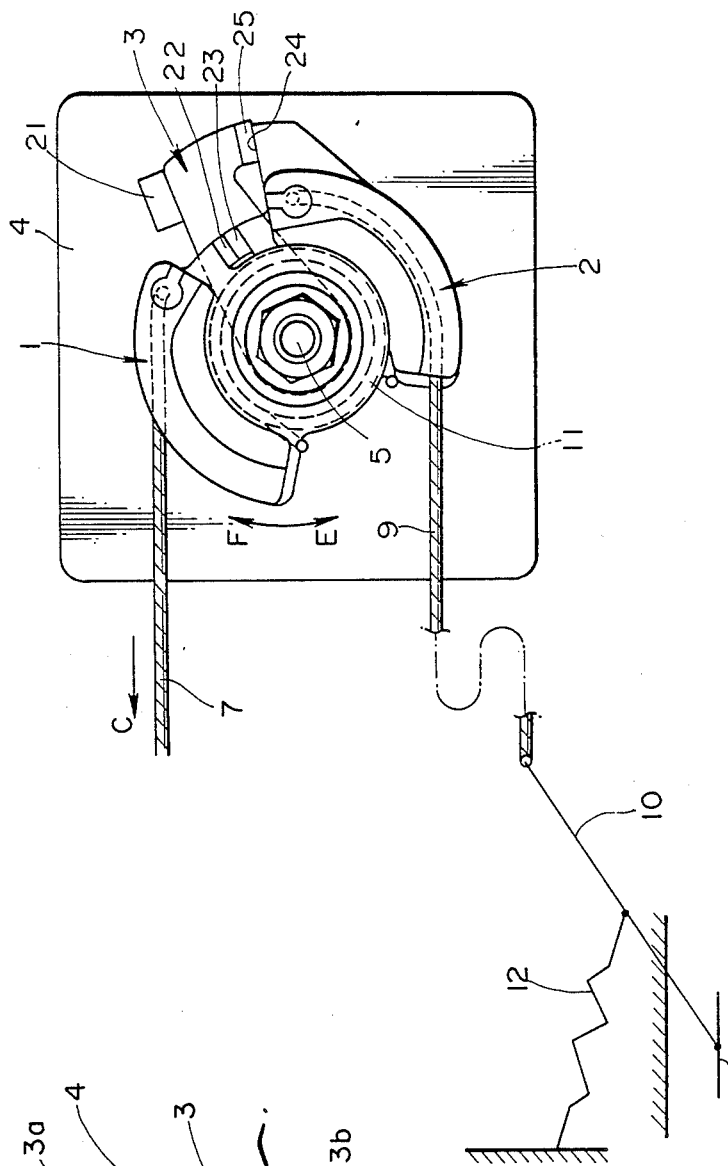
FIGS. 3 to 5 are views illustrating different operating states of the apparatus shown in FIG. 1.
Figure 6:
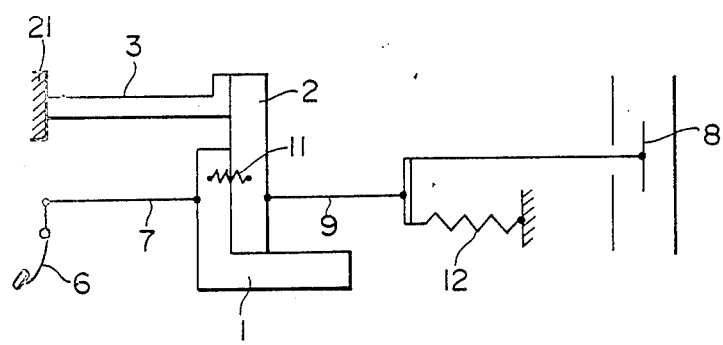
FIGS. 6 to 8 are diagrammatical views, respectively, corresponding to FIGS. 3 to 5.

When non-traction control is implemented—at the time of ordinary driving, the third lever 3 is at the initial position at which the fifth stopper section 26 is in abut with the stopper 21, as shown in FIGS. 1, 3, and 6. At this time, the second lever 2 is pivottable in a range in which the throttle valve 8 is displaced from the position of full closure to the position of full opening, and the third stopper section 25 is brought into abut with the fourth stopper section 24 at the pivotal position of the second lever 2 when the throttle valve 8 is fully opened. When the third lever 3 is at this initial position, the first lever 1 and the second lever 2 are held at the predetermined relative pivot position, as have been described hereinabove, at which the first stopper section 22 is brought into abut with the second stopper section 23 by the aid of the coil spring 11 as the second urging means. Accordingly, the first lever 1 is integrally pivoted with the second lever 2 in accordance with the accelerator pedal 6 being stepped down while held at the predetermined relative pivot position, thus permitting the throttle valve 8 to be opened at a desired degree in the range from the full closure to the full opening according to operation of the accelerator pedal 6. It is understood that FIG. 1 shows the manner in which the throttle valve 8 is fully closed and that FIGS. 3 and 6 show the manner in which the throttle valve 8 is fully opened.

(2) At the time of traction control

As a slip value of the driven wheel on pavement exceeds a predetermined value, a driving signal is fed from a control unit (not shown) to the motor 4 and the output shaft 5 of the motor 4 is rotated in the direction of arrow F, thus driving the third lever 3 in the direction of arrow F from the initial position. This structure permits the third stopper section 25 formed on the third lever 3 to be brought into abut with the fourth stopper section 24 formed on the second lever 2 from the direction of arrow F, thus forcibly pivoting the second lever 2 in the direction of arrow F. The pivotal movement of the second lever 2 in the direction of arrow F is carried out in resistance to the second urging means 11 using a driving force of the motor 4. As have been described hereinabove, even if the position at which the accelerator pedal 6 was stepped down is the same, the second lever 2 is forcibly returned in the direction of arrow F by the third lever 3 to reduce a degree of opening of the throttle valve 8, consequently converging or reducing slippage of the driven wheel to a smaller degree. In this embodiment, it is to be understood that the larger a slip value of the driven wheel the larger an amount of pivotal movement of the third lever 3 in the direction of arrow F, and further that the third lever 3 is designed so as to be capable of being pivoted until the throttle valve 8 is closed at the maximum.

Figure 7:
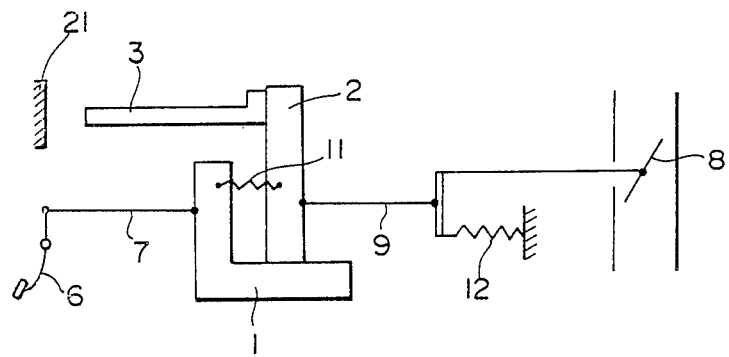

FIGS. 4 and 7 show a state in which the throttle valve 8 is returned by the third lever 3 back to a position at which it is slightly open from a position at which it was fully open. In this state, the throttle valve 8 can provide a desired degree of opening within a scope ranging from the position of full closure to the position as shown in FIGS. 4 and 7 in accordance with operation of the accelerator pedal 6 when the third lever 3 is brought into a fixed state because of trouble. Accordingly, the vehicle can be driven by itself with a low engine output to a tune-up station.

Figure 8:
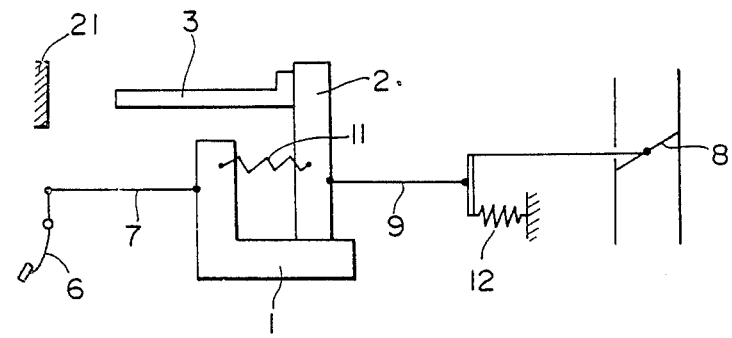

Referring to FIGS. 5 and 8, it is shown that the throttle valve 8 is returned by the third lever 3 back to the position at which it is fully closed. When the motor 4 becomes out of order and the third lever 3 is held in a fixed state, the throttle valve 8 is held in a state in which it is fully closed, that is, it is idled.

It is to be noted that, in instances where a maximum amount of a pivotal movement of the third lever 3 in the direction of arrow F may be set so as to be a degree as low as a degree of opening of the throttle valve 8 is opened to a degree as low as, for example, approximately 20%—in this case where the throttle valve 8 has a small degree of opening, a large degree of slip is unlikely to occur on the driven wheel—the engine can be aloways driven with a low output when the motor 4 is brought out of outer, then allowing the vehicle to be driven by itself to a servicing station.

As a slip value of the driven wheel becomes lower than a given value, the third lever 3 is returned again to its initial value.

As will be apparent in the course of the description above, it is to be noted that the third lever 3 does not act in a direction of opening the throttle valve 8. In other words, the throttle valve 8 can be opened carelessly by the third lever 3, thus preventing the engine from being overrotated as the operator does not expect.

It is to be understood that the foregoing text and drawings relate to embodiments of the present invention given by way of examples but not limitation. Various other embodiments and variants are possible within the spirit and scope of the present invention.

What is claimed is:

1. A throttle valve controlling apparatus for a vehicle comprising:
    a motor, wherein operation of said motor is controlled in accordance with a running state of the vehicle;
    a mounting shaft rotatably driven by said motor at one end portion thereof;
    a first lever pivotably mounted to the mounting shaft at a first position and connected to an accelerator so as to pivot in a first direction in accordance with downward movement of the accelerator;
    a second lever pivotably mounted to the mounting shaft at a second position, wherein said second position is between said first position and said one end portion of said mounting shaft, wherein said second lever is connected to the throttle valve so that the throttle valve is opened when the second lever is pivoted in said first direction;
    urging means having a first urging force for urging the throttle valve in a direction of closing the throttle valve;
    a third lever fixed to the mounting shaft at a third position, wherein said third position is between said second position and said one end portion of said mounting shaft;
    a first stopper portion formed on the first lever;
    a second stopper portion formed on the second lever, wherein said second stopper portion is adapted to abut the first stopper portion when the second lever is pivoted in said first direction; and
    a coil spring having a second urging force which is greater than said first urging force, wherein said coil spring is fitted onto an outer periphery of the mounting shaft between said first position and said second position and is engaged at a first end portion with the first lever and at a second end portion with the second lever, and wherein said coil spring urges the second lever toward the first lever so as to abut the first stopper portion against the second stopper portion;
    wherein the second lever is returned by the urging means in a direction opposite to said first direction upon a weaking of said second urging force caused by pivotal movement of the third lever, wherein said pivotal movement of said third lever is caused by the motor.

2. An apparatus as claimed in claim 1, wherein;
    the first lever is connected to the accelerator with a first wire cable; and
    the second lever is connected to the throttle valve with a second wire cable.

3. An apparatus as claimed in claim 2, wherein the first wire cable and the second wire cable extend each in a direction substantially perpendicular to the mounting shaft.

4. An apparatus as claimed in claim 1, wherein the mounting shaft is an output shaft of the motor.

5. An apparatus as claimed in claim 1, wherein:
    the third lever is provided with a third stopper portion; and the second lever is provided with a fourth stopper adapted to abut said third stopper portion;

wherein the third stopper portion abuts the fourth stopper portion when the third lever is pivoted by the motor in a direction opposite said first direction to forcibly pivot the second lever in a direction opposite said first direction.

6. An apparatus as claimed in claim 1, wherein the first lever and the second lever are mounted to the mounting shaft each through a ball bearing.

7. In a vehicle equipped with a traction device adapted to return a throttle valve of an engine toward a direction of forcibly closing the throttle valve when a slip value of a driven wheel on pavement becomes larger than a predetermined value, an apparatus for controlling a degree of opening of the throttle valve comprising:

a motor;

a mounting shaft rotatably driven by said motor at one end portion thereof;

a first lever pivotably mounted to the mounting shaft at a first position and connected to an accelerator so as to pivot in a first direction in accordance with downward movement of the accelerator;

a second lever pivotably mounted to the mounting shaft at a second position, wherein said second position is between said first position and said one end portion of said mounting shaft, wherein said second lever is connected to the throttle valve so that the throttle valve is opened when the second lever is pivoted in said first direction;

urging means having a first urging force for urging the throttle valve in a direction of closing the throttle valve;

a third lever fixed to the mounting shaft at a third position, wherein said third position is between said second position and said one end portion of said mounting shaft;

a first stopper portion formed on the first lever;

a second stopper portion formed on the second lever, wherein said second stopper portion is adapted to abut the first stopper portion when the second lever is pivoted in said first direction; and a coil spring having a second urging force which is greater than said first urging force, wherein said coil spring is fitted onto an outer periphery of the mounting shaft between said first position and said second position and is engaged at a first end portion with the first lever and at a second end portion with the second lever, and wherein said coil spring urges the second lever toward the first lever so as to abut the first stopper portion against the second stopper portion;

wherein the third lever is pivoted in a direction opposite said first direction by the motor when the slip value of the driven wheel on pavement reaches or exceeds the predetermined value so as to return the second lever in a direction opposite to said first direction by the urging means in accordance with a weaking of said second urging force.

8. An apparatus as claimed in claim 7, wherein:

the first lever is connected to the accelerator with a first wire cable; and the second lever is connected to the throttle valve with a second wire cable.

9. An apparatus as claimed in claim 8, wherein the first wire cable and the second wirer cable extend each in a direction substantially perpendicular to the mounting shaft.

10. An apparatus as claimed in claim 7, wherein the mounting shaft is an output shaft of the motor.

11. An apparatus as claimed in claim 7, wherein:

the third lever is provided with a third stopper portion; and the second lever is provided with a fourth stopper adapted to abut said third stopper portion;

wherein the third stopper portion abuts the fourth stopper portion when the third lever is pivoted by the motor in a direction opposite said first direction to forcibly pivot the second lever in a direction opposite said first direction.

12. An apparatus as claimed in claim 7, wherein the first lever and the second lever are mounted to the mounting shaft each through a ball bearing.

* * * * *